United States Patent [19]

Kerklies

[11] Patent Number: 4,512,459
[45] Date of Patent: Apr. 23, 1985

[54] GUIDE ASSEMBLY FOR A CURVED SECTION OF A SCRAPER-CHAIN CONVEYOR

[75] Inventor: Bodo Kerklies, Lunen, Fed. Rep. of Germany

[73] Assignee: Gewerkschaft Eisenhutte Westfalia, Fed. Rep. of Germany

[21] Appl. No.: 386,494

[22] Filed: Jun. 9, 1982

[30] Foreign Application Priority Data

Jun. 12, 1981 [DE] Fed. Rep. of Germany ....... 3123374

[51] Int. Cl.³ .............................................. B65G 19/00
[52] U.S. Cl. .................................................. 198/729
[58] Field of Search ............... 198/735, 842, 831, 729; 474/902, 162, 174; 74/446, 447

[56] References Cited

U.S. PATENT DOCUMENTS

| 3,472,090 | 10/1969 | Dawe | 74/447 |
| 3,777,876 | 12/1973 | Schreier et al. | 198/729 |
| 4,250,989 | 2/1981 | Gründken et al. | 198/735 X |
| 4,360,102 | 11/1982 | Beckmann | 198/729 |

FOREIGN PATENT DOCUMENTS 2301348  1/1972  Fed. Rep. of Germany ...... 198/729

Primary Examiner—Joseph E. Valenza
Assistant Examiner—Dennis Williamson
Attorney, Agent, or Firm—Neil F. Markva

[57] ABSTRACT

A guide assembly for a curved section of a scraper-chain conveyor comprises a housing and two pulley wheels which are rotatably mounted within the housing. The pulley wheels constitute means for guiding the scrapers of a scraper assembly around the curved section. Each of the pulley wheels has an inner wheel part and a two-part scraper-engaging rim detachably connected to its inner wheel part.

12 Claims, 3 Drawing Figures

GUIDE ASSEMBLY FOR A CURVED SECTION OF A SCRAPER-CHAIN CONVEYOR

BACKGROUND TO THE INVENTION

This invention relates to a guide assembly for a curved section of a scraper-chain conveyor.

In order to direct the scraper assembly of a scraper-chain conveyor around a curve in as friction-free a manner as possible, it is known to use a guide assembly having guide means constituted by two vertically-spaced, independently-rotatable pulley wheels. The scrapers of the scraper assembly bear radially against the upper pulley wheel when in the upper (conveying) run, and bear radially against the lower pulley wheel when in the lower (return) run. In operation, the pulley wheels are rotated by their interaction with the scrapers, and they conduct the scraper assembly around the curve with only low friction losses. Typically, an assembly of this type is used in an underground mine in the region where a longwall working joins a roadway, the assembly being used to guide the run of a longwall conveyor into the roadway.

In this type of assembly, the vertical axle which carries the pulley wheels is held within a housing which accommodates the pulley wheels. The pulley wheels are circumferentially profiled to correspond to the profiling of the inner (scraper-guiding) side walls of the channel sections of the conveyor.

In a known guide assembly of this type, the pulley wheels are rotatably mounted on their axle by means of roller bearings, and the pulley wheels, the axle and the bearings are removable as a unit from the guide assembly housing. This facilitates the fitting and dismantling of the heavy and bulky guide assembly to a curved conveyor section, and this is particularly important where space is restricted (as is normally the case at the longwall/roadway junctions of an undergound mine). A guide assembly of this type is described in DE-OS No. 2 817 949.

The aim of the invention is to provide an improved guide assembly for a curved section of a scraper-chain conveyor.

SUMMARY OF THE INVENTION

The present invention provides a guide assembly for a curved section of a scraper-chain conveyor, the assembly comprising a housing and two pulley wheels which are rotatably mounted within the housing, the pulley wheels constituting means for guiding the scrapers of a scraper assembly around a curved section of a scraper-chain conveyor, wherein each of the pulley wheels has an inner wheel part and a multi-part scraper-engaging rim detachably connected to said inner wheel part.

The separation of each pulley wheel into an inner wheel part and a multi-part hub enables the pulley wheels (which when fitted together are large and bulky) to be transported in bits. Moreover, the outer rims of the pulley wheels are easily replaceable, when worn, without the entire pulley wheels needing replacement.

The inner wheel part of each pulley wheel may be of composite one-piece construction. This is advantageous from the point of view of stability, and it also helps with the mounting of the pulley wheels in the housing.

Advantageously, the rim of each pulley wheel is constituted by two identical parts. Preferably, the rim of each of the pulley wheels is provided with a circumferential groove having a profile which matches the profile of the ends of the associated scrapers.

In a preferred embodiment, the rim and inner wheel part of each pulley wheel are provided with overlapping flanges, and detachable connection means are provided for connecting said flanges to one another.

Conveniently, the pulley wheels are independently rotatably mounted on an axle mounted within the housing. Preferably, the pulley wheels are rotatably mounted on a sleeve surrounding the axle by means of respective bearing assemblies, the pulley wheels, the bearing assemblies and the sleeve being removable from the housing as a unit, and the axle being removable from said sleeve.

In a preferred embodiment, the housing is constituted by a base plate arranged beneath the pulley wheels, a cover plate arranged above the pulley wheels, and a panel arranged between the pulley wheels. Advantageously, the ends of the axle are supported by the base plate and the cover plate.

The housing may be formed in two detachably connected parts. Preferably, the base plate, the cover plate and the panel are each formed in two parts, a common plane separating the two parts of the base plate, the cover plate and the panel, said plane of separation passing through the axis of the axle. Where the guide assembly is used with a curved conveyor section that curves through an arc of 90°, the plane of separation is preferably inclined at 45° to each end of the curved conveyor section.

Advantageously, the two parts of the base plate are detachably connected together, and the two parts of the cover plate are detachably connected together. Preferably, the adjoining edges of the two parts of the base plate are provided with downwardly-extending flanges which are detachably connected together, and wherein the two parts of the cover plate are provided with upwardly-extending flanges which are detachably connected together. Conveniently, said flanges are detachably connected together by means of joints and/or screw-threaded members.

Preferably, the upper end of the axle is held within the cover plate by an upper end fitting, and the lower end of the axle is held within the base plate by a lower end fitting, and wherein each of said fittings is constituted by a pair of semi-cylindrical shells.

The assembly may further comprise an annular connector ring which is detachably connected to the two parts of the base plate, the connector ring being seated in an annular groove formed in the base plate parts, the annular groove being coaxial with an axle.

Advantageously, the circumferential groove in the rim of each pulley wheel has upper and lower inclined faces, said faces defining an included angle which is greater than the angle defined by the upper and lower faces of the ends of the associated scrapers.

The invention also provides a curved section and guide assembly arrangement for a scraper-chain conveyor, the arrangement comprising a curved conveyor section and a guide assembly, the guide assembly being as defined above.

Preferably, the base plate extends beneath the curved conveyor section, and the panel is joined to the floor plate of the curved conveyor section, and wherein said floor plate is formed in two parts whose plane of separation is the same as that of the panel. Conveniently, each part of the panel is connected to its associated floor plate part by means of a tongue-and-groove connection, and the two parts of the floor plate are detachably connected together.

The invention further provides a guide assembly for a curved section of a scraper-chain conveyor, the assembly comprising a housing and two pulley wheels rotatably mounted in the housing, the housing being constituted by a base plate arranged beneath the pulley wheels, a cover plate arranged above the pulley wheels, and a panel arranged between the pulley wheels, wherein the base plate, the cover plate and the panel are each formed in two parts, a common plane separating the two parts of the base plate, the cover plate and the panel.

Preferably, the pulley wheels are independently rotatably mounted on an axle, the ends of the axle being supported by the base plate and the cover plate, and wherein said plane of separation passes through the axis of the axle. This feature is advantageous in that the housing parts are separable for transportation purposes. Moreover, the pulley wheel units can be inserted into, and withdrawn from, the housing when the housing parts are unconnected. This facilitates the fitting and dismantling of the pulley wheels.

BRIEF DESCRIPTION OF THE DRAWINGS

A guide assembly for a scraper-chain conveyor curved section and constructed in accordance with the invention will now be described, by way of example, with reference to the accompanying drawings, in which.

DESCRIPTION OF PREFERRED EMBODIMENT

Figure 1:
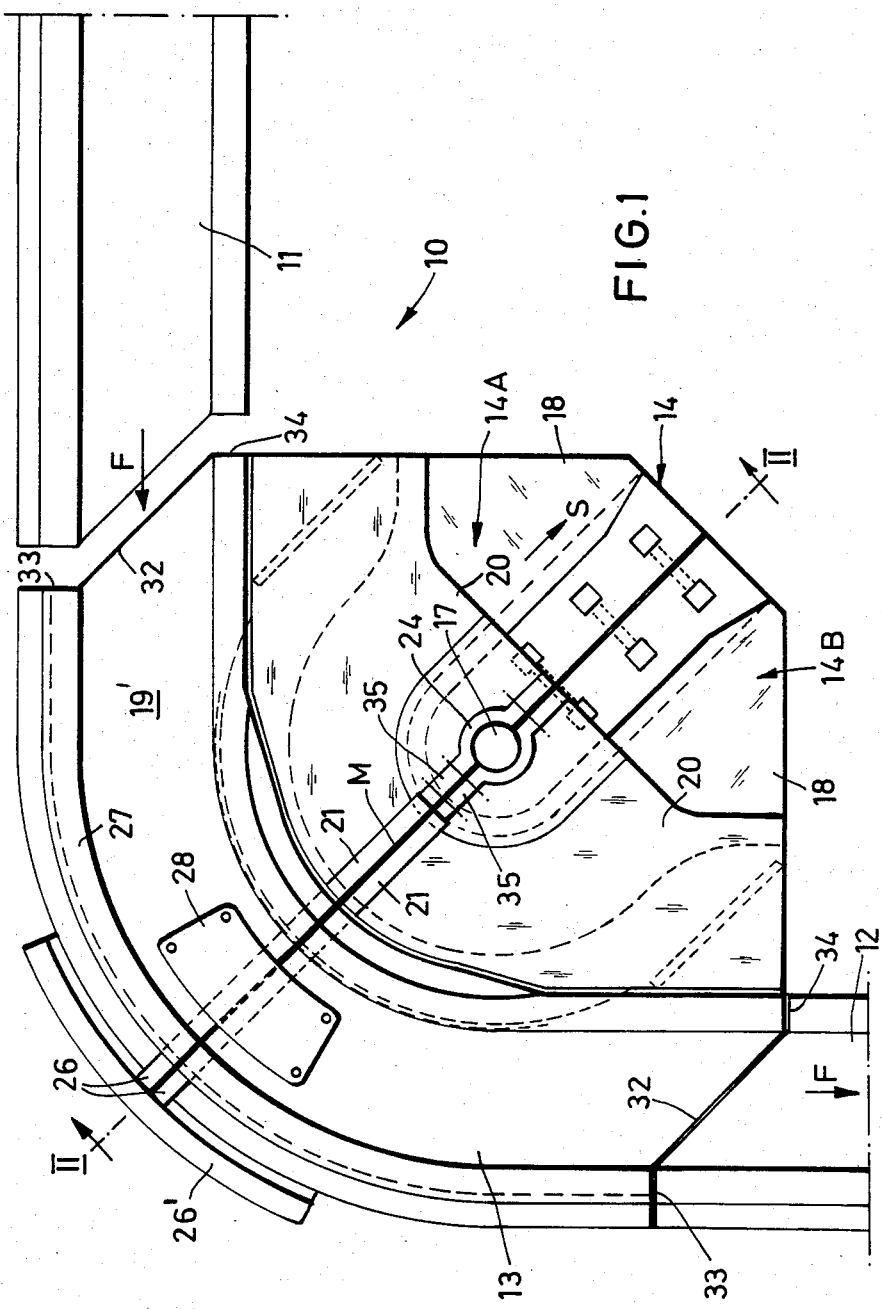
FIG. 1 is a diagrammatic plan view of a curved conveyor section and the guide assembly.

Referring to the drawings, FIG. 1 shows a curved conveyor section and guide assembly arrangement, indicated generally by the reference numeral 10, of a scraper-chain conveyor. The arrangement 10 includes a curved conveyor section 13 which serves to connect the end conveyor channel sections 11 and 12 of two straight conveyor portions. Each of the straight conveyor portions is constituted, in a known manner, by a plurality of channel sections which are joined together end-to-end in such a manner as to permit limited articulation therebetween. The two straight conveyor portions lie at right-angles to one another, with the portion containing the channel section 11 being positioned in a longwall working (not shown), and with the portion containing the channel section 12 being positioned in a roadway (not shown). Thus, the curved section 13 curves through 90°.

The arrangement 10 includes, in one constructional unit, the curved section 13 and a housing 14 containing upper and lower pulley wheels 15 and 16 respectively. The pulley wheels 15 and 16 are independently rotatably mounted on a common vertical axle 17 attached to the housing 14. The pulley wheels 15 and 16 engage the inner ends of the scrapers of the scraper assembly of the conveyor so as to guide the scraper assembly round the curved section 13. The housing 14 is of two-part construction, being divided into two parts 14A and 14B along the plane M of the section line II—II (see FIG. 1).

The plane M of division thus lies at 45° to each of the straight conveyor portions. The housing 14 is constituted by a two-part base plate 18, a two-part panel 19, and a two-part cover plate 20. The panel 19 separates the pulley wheels 15 and 16, and is joined to the floor plate 19' of the curved section 13. The two parts of the base plate 18, the panel 19 and the cover plate 20 are firmly, but detachably, connected to one another along the plane M. Thus, vertical flanges 21 are welded to the adjoining edges of the two parts of the base plate 18, and these flanges are detachably connected together by joints 22 and bolts 23. Similarly, the two parts of the cover plate 20 are connected together by means of welded-on vertical flanges 21, joints 22 and bolts 23.

The axle 17 is guided and supported in the housing 14 by means of an upper fitting 24 associated with the cover plate 20, and by means of a lower fitting 25 associated with the base plate 18. These fittings 24 and 25 take up the forces acting on the pulley wheels 15 and 16. Each of the fittings 24 and 25 defines a bore for receiving a free end of the axle 17, and each is constituted by a pair of semi-cylindrical shells. Each of these shells forms part of, or is attached to, the associated part of the base plate 18 or the cover plate 20.

At the outer portion of the curved section 13, the floor plate 19' is connected to the base plate 18 by means of vertical flanges 26. The flanges 26 extend upwards from the base plate 18 to the upper edge of the outer side wall 27 of the curved section 13. The two flanges 26 are detachably connected together by means of joints 22 and bolts 23, and so assist with the detachable connection of the two housing parts 14A and 14B. A further connection between the two housing parts 14A and 14B can be effected, in the region of their flanges 26, by means of external reinforcement members 26' (see FIG. 1). The two parts of the panel 19 are connected to the two parts of the floor plate 19' by means of tongue-and-groove joints 53. An access aperture in the parts of the floor plate 19' of the curved section 13 is covered by an insert plate 28. This insert plate 28 is inset into the floor plate 19', and is screwed to the two parts thereof. Consequently, the insert plate 28 also helps to connect the two parts of the floor plate 19' and hence to connect the two parts of the panel 19.

Figure 2:
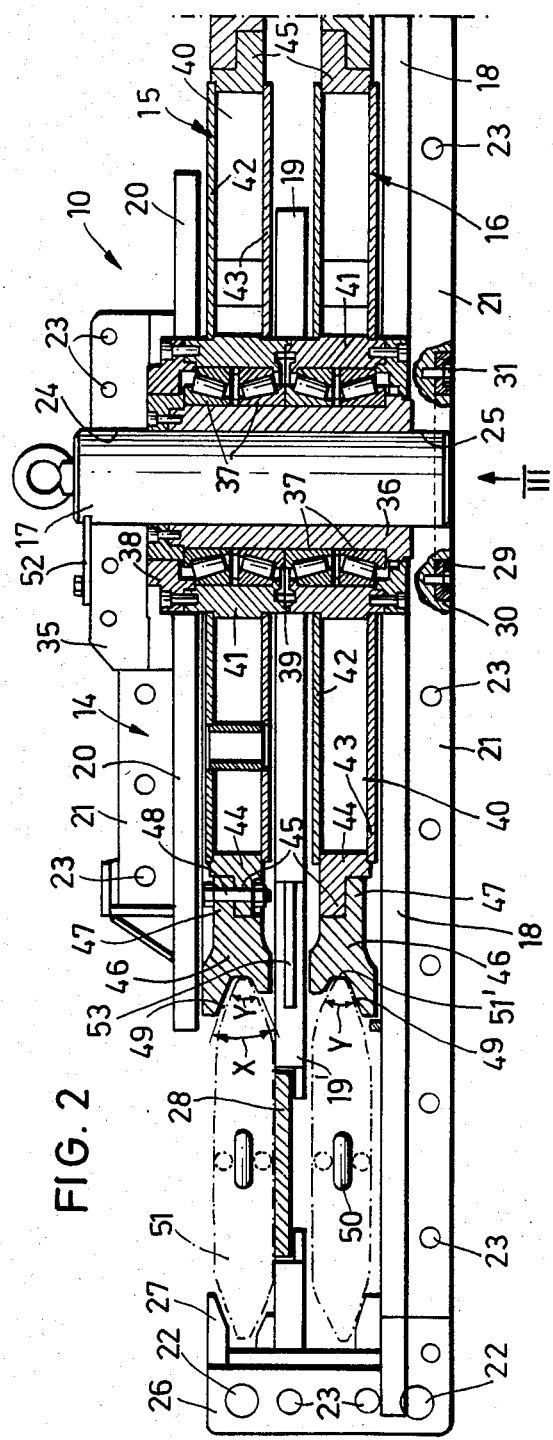
FIG. 2 is a cross-section taken on the line II—II of FIG. 1.
Figure 3:
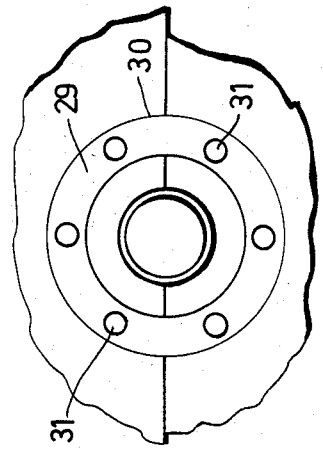
FIG. 3 shows a detail looking in the direction of the arrow III shown in FIG. 2.

As shown in FIGS. 2 and 3, the two parts 14A and 14B of the housing 14 are also connected together by means of an annular connector 29. The connector 29 is seated within an annular recess 30 formed in the underneath side of the two-part base plate 18, and is screwed to these base plate parts by means of bolts 31. The connector 29 serves to align the two housing parts 14A and 14B in the region of the lower fitting 25.

As shown in FIG. 1, each end of the curved section 13 is somewhat Z-shaped in plan. Thus, the end face 32 of the floor plate (panel) 19 extends at an acute angle to the conveying direction F, whereas the end faces 33 and 34 of the side walls of the curved section 13 extend, in the usual way, at right-angles to the conveying direction. The end faces 33 and 34 are, however, off-set with respect to one another in the conveying direction F. The adjoining channel sections 11 and 12 of the straight conveyor portions are joined to the assembly 10 at these end faces 33 and 34.

The two parts of the cover plate 20 are also connected together in the region of the upper fitting 24. For this purpose, upwardly-extending flanges 35 are welded to the adjoining edges of the cover plate parts on both sides of the upper fitting 24, and these flanges are detachably fixed to one another by means of bolts 23. The flanges 35 are of increased cross-section in the region of the fitting 24.

The two pulley wheels 15 and 16 form a composite unit together with their bearings, this unit being sealed from the exterior. Each of the pulley wheels 15 and 16 is provided with two tapered roller bearings 37. The bearings 37 are made fast axially, inter alia by means of an end ring 38, on a sleeve 36 which surrounds the axle 17. The arrangement of the bearings 37 results in a large support area for the pulley wheels 15 and 16. The pulley wheels 15 and 16 each has an inner part 40 and an outer part 46. Each inner wheel part 40 has a hub 41 rotatably supported on the sleeve 36 by the associated bearings 37. Each inner wheel part 40 also has a pair of annular discs 42 and 43 welded to its hub 41, and an annular web 44 welded to the outer circumferential edges of said discs. Each inner wheel part 40, is therefore, a composite unitary member. Each of the annular webs 44 is formed with a radially-outwardly-extending flange 45. The hubs 41 of the two pulley wheels 15 and 16 (which, in use, rotate in opposite directions) are sealed with respect to one another by means of a metal slide-ring packing 39 having a labyrinth seal.

Each outer wheel part 46 constitutes a wheel rim, and is of two part construction. The two segments of each rim 46 are identical, and each has an inwardly-extending flange 47. The flanges 47 of the rims 46 overlap the outwardly-extending flanges 45 of the corresponding inner wheel parts 40, and are detachably connected thereto by bolts 48. The adjoining end faces of the two segments of each rim 46 are connected together, for example, by screw-threaded members (not shown).

The rims 46 are each formed with a circumferential groove 49. The grooves 49 are shaped to conform with the profiled ends of the scrapers of the scraper assembly; but are slightly larger than these profiled ends, thereby permitting a predetermined amount of play. The scrapers, which are secured to an endless, central drive chain 50, are indicated (see FIG. 2) in dash-dot lines by the reference numeral 51. As shown, the profiled ends of the scrapers 51 engage within the grooves 49 as the scraper assembly passes round the curved section 13. The angle X between the upper and lower inclined walls which define each of the grooves 49 is slightly greater than the angle Y between the converging end faces of the profiled ends 51' of the scrapers 51. Thus, the scrapers 51 abut the rims 46 substantially only in the regions of their outer end faces 51'. This helps to prevent harmful tilting moments being transmitted to the bearings 37, and hence reduces bearing wear.

The axle 52 is held in the position shown by means of a retaining plate 52 (see FIG. 2). In order to remove the pulley wheels 15 and 16 from the housing 14, it is necessary first to remove the retaining plate 52. When this has been done, the axle 17 can be withdrawn upwards, and the pulley wheels 15 and 16 (together with the sleeve 36, the bearings 37 and the end ring 38) can be removed in the direction of the arrow S (see FIG. 1). Once the pulley wheels 15 and 16 are free of the housing 14, their rims 46 can easily be removed for repair of replacement.

Because the pulley wheels are of multi-part construction, they can be transported in parts, thereby reducing the size and weight of individual parts being moved.

I claim:

1. A guide assembly for a curved section of a scraper-chain conveyor, the assembly comprising:
    (a) a housing and two pulley wheels which are rotatably mounted within the housing,
    (b) the pulley wheels constituting means for guiding the scrapers of a scraper assembly around a curved section of a scraper-chain conveyor,
    (c) each of the pulley wheels having an inner wheel part and a multi-part scraper-engaging rim detachably connected to said inner wheel part,
    (d) the pulley wheels being independently rotatably mounted on an axle mounted within the housing,
    (e) the housing being formed in two detachably-connected parts and including a base plate arranged beneath the pulley wheels, a cover plate arranged above the pulley wheels, and a panel arranged between the pulley wheels,
    (f) the ends of the axle being supported by the base plate and the cover plate,
    (g) the base plate, the cover plate and the panel each being formed in two parts, a common plane of separation separating the two parts of the base plate, the cover plate and the panel with said plane of separation passing through the axis of the axle,
    (h) the upper end of the axle being held within the cover plate by an upper end fitting, and the lower end of the axle being held within the base plate by a lower end fitting,
    (i) each of said fittings being constituted by a pair of semi-cylindrical shells.

2. A guide assembly according to claim 1, wherein the axle is removable axially from said sleeve.

3. A guide assembly according to claim 1, wherein the housing is formed in two detachably-connected parts.

4. A guide assembly according to claim 1, wherein
    the two parts of the base plate being detachably connected together, and
    the two parts of the cover plate being detachably connected together.

5. A guide assembly according to claim 4, wherein
    the adjoining edges of the two parts of the base plate include downwardly-extending flanges detachably connected together, and
    the two parts of the cover plate include upwardly-extending flanges detachably connected together.

6. A guide assembly according to claim 5, wherein said flanges are detachably connected together by joints and/or screw-threaded members.

7. A guide assembly for a curved section of a scraper-chain conveyor, the assembly comprising:
    (a) a housing and two pulley wheels which are rotatably mounted within the housing,
    (b) the pulley wheels constituting means for guiding the scrapers of a scraper assembly around a curved section of a scraper-chain conveyor,
    (c) each of the pulley wheels having an inner wheel part and a multi-part scraper-engaging rim detachably connected to said inner wheel part,
    (d) the pulley wheels being independently rotatably mounted on an axle mounted within the housing,
    (e) the housing being formed in two detachably-connected parts and including a base plate arranged beneath the pulley wheels, a cover plate arranged above the pulley wheels, and a panel arranged between the pulley wheels,
    (f) the ends of the axle being supported by the base plate and the cover plate,
    (g) the base plate, the cover plate and the panel each being formed in two parts, a common plane of separation separating the two parts of the base plate, the cover plate and the panel with said plane of separation passing through the axis of the axle, (h) an annular connector ring being detachably connected to the two parts of the base plate, (i) the connector ring being seated in an annular groove formed in the base plate parts, the annular groove being coaxial with the axle.

8. A guide assembly according to claim 7, wherein the axle is removable axially from said sleeve.

9. A guide assembly according to claim 7, wherein the housing is formed in two detachably-connected parts.

10. A guide assembly according to claim 7, wherein the two parts of the base plate being detachably connected together, and the two parts of the cover plate being detachably connected together.

11. A guide assembly according to claim 10, wherein the adjoining edges of the two parts of the base plate include downwardly-extending flanges detachably connected together, and the two parts of the cover plate include upwardly-extending flanges detachably connected together.

12. A guide assembly according to claim 11, wherein said flanges are detachably connected together by joints and/or screw-threaded members.

* * * * *